United States Patent
Kennedy (10) Patent No.: US 8,113,314 B2
(45) Date of Patent: Feb. 14, 2012

(54) STAIR SYSTEM FOR OILFIELD TANK

(75) Inventor: Theron Jim Kennedy, Wichita Falls, TX (US)

(73) Assignee: Wichita Tank Manufacturing, Ltd., Wichita Falls, TX (US)

( * ) Notice: Subject to any disclaimer, the term of this patent is extended or adjusted under 35 U.S.C. 154(b) by 589 days.

(21) Appl. No.: 12/333,892

(22) Filed: Dec. 12, 2008

(65) Prior Publication Data

US 2009/0090581 A1   Apr. 9, 2009

(51) Int. Cl.
*E04G 3/00* (2006.01)
(52) U.S. Cl. ............. 182/84; 182/82; 182/62.5; 182/95
(58) Field of Classification Search .................... 182/83, 182/84, 85, 86, 62.5, 106, 95, 127
See application file for complete search history.

(56) References Cited

U.S. PATENT DOCUMENTS

| | | | | |
|---|---|---|---|---|
| 31,216 | A * | 1/1861 | Sprague | 182/62.5 |
| 159,571 | A * | 2/1875 | Fuchslocher et al. | 182/62.5 |
| 289,726 | A * | 12/1883 | Tevis | 160/139 |
| 1,713,730 | A * | 5/1929 | Wright | 105/425 |
| 2,933,149 | A * | 4/1960 | Lee | 182/78 |
| 3,047,093 | A * | 7/1962 | Cruz | 182/97 |
| 3,067,835 | A * | 12/1962 | Valley | 182/95 |
| 4,014,486 | A * | 3/1977 | Nelson et al. | 244/129.6 |
| 4,669,574 | A * | 6/1987 | Moutot | 182/88 |
| 4,787,111 | A * | 11/1988 | Pacek et al. | 14/71.1 |
| 5,026,244 | A * | 6/1991 | Dorn | 414/540 |
| 5,027,922 | A | 7/1991 | Benko et al. | |
| 5,064,022 | A * | 11/1991 | Graham | 182/85 |
| 5,154,569 | A * | 10/1992 | Eryou et al. | 414/495 |
| 5,213,367 | A | 5/1993 | Norman, Jr. et al. | |
| 5,553,990 | A * | 9/1996 | Kytola, Sr. | 414/659 |
| 5,845,356 | A * | 12/1998 | Kielinski | 14/69.5 |
| 6,152,492 | A * | 11/2000 | Markham et al. | 280/837 |
| D442,520 | S | 5/2001 | Wade | |
| 6,279,955 | B1 | 8/2001 | Fisher | |
| 6,375,222 | B1 | 4/2002 | Wade | |
| 6,390,325 | B1 * | 5/2002 | Gonzales | 220/567.2 |
| 6,598,704 | B2 * | 7/2003 | Hansen | 182/113 |
| 6,981,572 | B2 * | 1/2006 | Hedley | 182/95 |
| 6,986,402 | B2 * | 1/2006 | Hedley et al. | 182/95 |
| 7,004,286 | B2 * | 2/2006 | Fredette | 182/62.5 |
| 7,025,174 | B1 * | 4/2006 | Hawley | 182/88 |
| 7,140,467 | B2 * | 11/2006 | Cook | 182/143 |
| 7,296,640 | B2 * | 11/2007 | Tettleton | 175/66 |
| 7,516,997 | B2 * | 4/2009 | Kuznarik et al. | 296/62 |
| 7,762,588 | B2 * | 7/2010 | Markham | 280/839 |
| 7,775,169 | B2 * | 8/2010 | Horn et al. | 111/200 |
| 7,832,525 | B2 * | 11/2010 | Bennett et al. | 182/36 |

(Continued)

OTHER PUBLICATIONS

"Extendable Access Bridge for Trucks and Railcars" Modular Access Systems, LLC http://www.modularaccess.com/Gangway.aspx.*

(Continued)

*Primary Examiner* — Katherine Mitchell
*Assistant Examiner* — Johnnie A Shablack
(74) *Attorney, Agent, or Firm* — James E. Walton; Richard G. Eldredge (57) ABSTRACT

A stair system for a mobile storage tank includes a platform subsystem attached to a wall of the mobile storage tank, a staircase subsystem coupled to the platform subsystem, and a rail subsystem attached to the staircase subsystem. The platform subsystem includes a retractable platform extension, and the staircase and rail subsystem are configured to be extended for use and retracted for transit and non-use modes of operation.

15 Claims, 7 Drawing Sheets

U.S. PATENT DOCUMENTS

| | | | |
|---|---|---|---|
| 2001/0030081 A1* | 10/2001 | Morimoto et al. | 182/85 |
| 2004/0159492 A1* | 8/2004 | Hedley et al. | 182/86 |
| 2006/0272896 A1* | 12/2006 | Rajewski | 182/127 |
| 2007/0125598 A1* | 6/2007 | Castagno et al. | 182/127 |
| 2007/0256893 A1* | 11/2007 | Horn et al. | 182/127 |
| 2008/0006304 A1 | 1/2008 | Treherne et al. | |
| 2009/0145692 A1* | 6/2009 | Flickinger et al. | 182/127 |

OTHER PUBLICATIONS

Dragon Products LTD, Connecting Catwalk Corrugated Wall Liquid Storage, date of publication is unknown Internet address: http://www.dragonproductsltd.com/tanks/fr%20 corrugated %20 wall 20connecting.htm.

* cited by examiner

STAIR SYSTEM FOR OILFIELD TANK

BACKGROUND

1. Field of the Invention

The present invention relates to a stair system, and more particularly to a stair system for a mobile storage tank.

2. Description of Related Art

Figure 1:
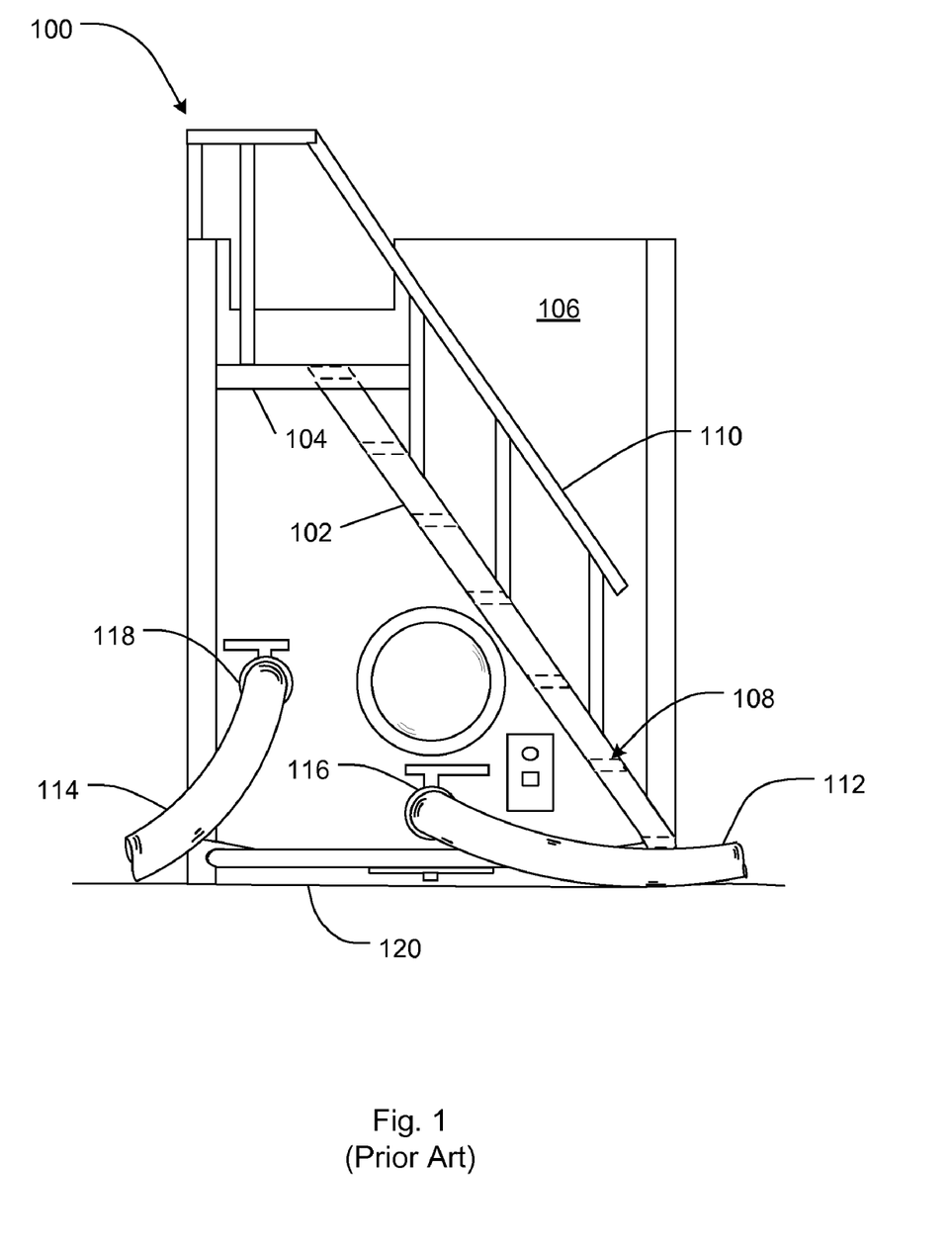
FIG. 1 is a front view of a conventional stair system for a mobile storage tank.

Stair systems, particularly those for mobile oilfield tanks, include a staircase attached to a platform for access to the top surface of the tank. For example, FIG. 1 shows a conventional stair system 100 having a staircase 102 and a platform 104 attached to a wall surface 106. Staircase 102 carries a plurality of stairs 108 and a hand rail 110 for providing support and security as the worker climbs and descends staircase 102.

Typically, multiple oilfield tanks are positioned side-by-side and joined together with tubing to create a large reservoir for storing and dispensing liquids such as fracturing fluids, drilling mud, crude oil, and various other liquids or slurries. A well-known problem with the conventional stair system is that the worker must climb and descend each staircase to get from one tank to another; and, the worker must step over tubing, manifolds, and other devices to get to the stairs. This process is time consuming and can be dangerous. For example, FIG. 1 shows tubing 112, 114 attached to valves 116, 118, respectively. Tubing 112, 114 are shown lying on ground 120 and exposed to rain, ice, snow, or fluids stored or dispensed by the oilfield tank. The tubing could be caked with mud or other slippery substances. Tubing also has a propensity to move with pressure fluctuations. A worker could easily trip on the tubing, manifolds, and other devices when traveling between stair systems.

Thus, there exists significant room for improvement in the art for overcoming these and other shortcomings of conventional stair systems for oilfield tanks.

DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

DETAILED DESCRIPTION OF THE PREFERRED EMBODIMENT

Illustrative embodiments are described below. In the interest of clarity, not all features of an actual implementation are described in this specification. It will of course be appreciated that in the development of any such actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

Figure 2A:
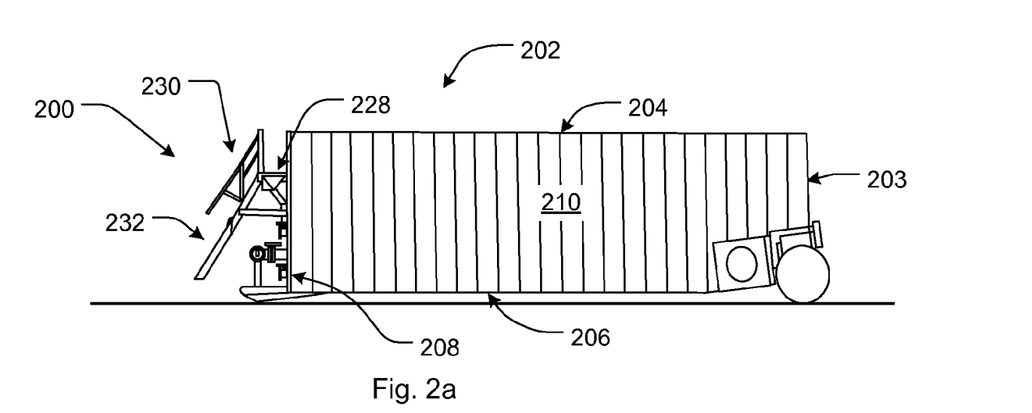
FIG. 2a is a side view of a stair system for a mobile storage tank according to the preferred embodiment wherein the stair system is shown in extended mode.
Figure 2B:
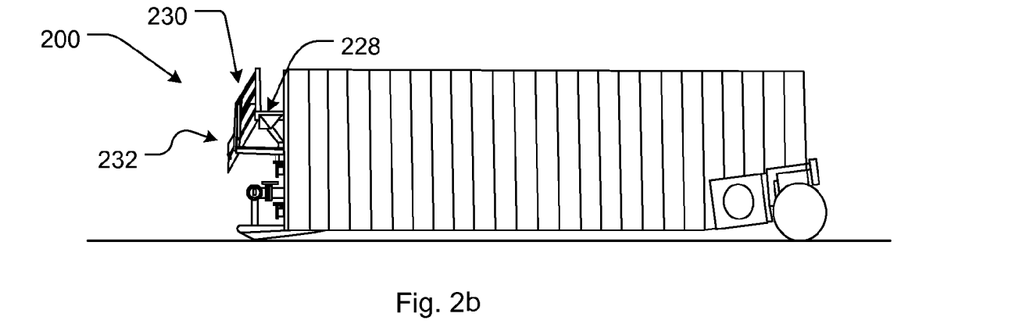
FIG. 2b is a side view of a stair system for a mobile storage tank according to the preferred embodiment wherein the stair system is shown in retracted mode.
Figure 2C:
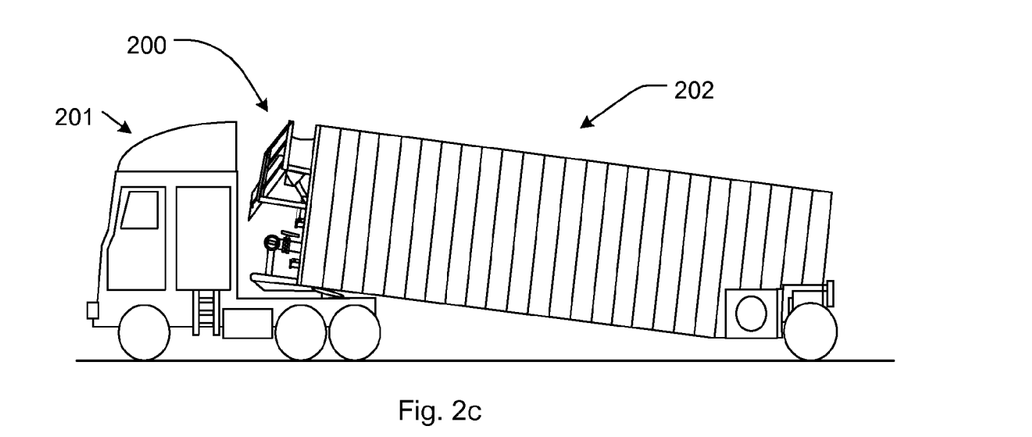
FIG. 2c is a side view of a stair system for a mobile storage tank according to the preferred embodiment wherein the stair system is shown in retracted mode.

Referring to FIGS. 2a-c in the drawings, side views of a stair system 200 for an oilfield tank 202 according to the preferred embodiment are illustrated. FIGS. 2a, 2b, and 2c depict stair system 200 in extended and retracted, respectively. FIG. 2a shows staircase subsystem 232 and rail subsystem 230 in an extended position. This position provides a worker (not shown) access to a top surface 204 of oilfield tank 202. FIG. 2b shows staircase subsystem 232 and rail subsystem 230 in a folded position. In this position, stair system 200 is either being prepared for transit, storage, or interlinked between oilfield tanks, wherein only platform subsystem 228 is operational. For example, FIG. 6 in the drawings shows stair system 200 in a folded position. In this configuration, platform subsystem 228 forms a walkway along oilfield tanks 202A, 202B, and 202C. FIG. 2c illustrates stair system 200 in a folded position and oilfield tank 202 hitched to a tractor 201. In this position, stair system 200 is prepared for transit.

In the preferred embodiment, stair system 200 attaches to an oilfield tank 202. It should be understood that the stair system could attach to alternative surfaces, and should not be limited to oilfield tanks. For example, the stair system could attach to various types of mobile tanks, vehicles, buildings, and other similar objects or devices. In the preferred embodiment, members of stair system 200 are composed of rigid metallic materials, but it should be appreciated that alternative embodiments could include members composed of different material. For example, stair system 200 could include members composed of plastic, wood, composite, and other suitable materials.

Figure 6:
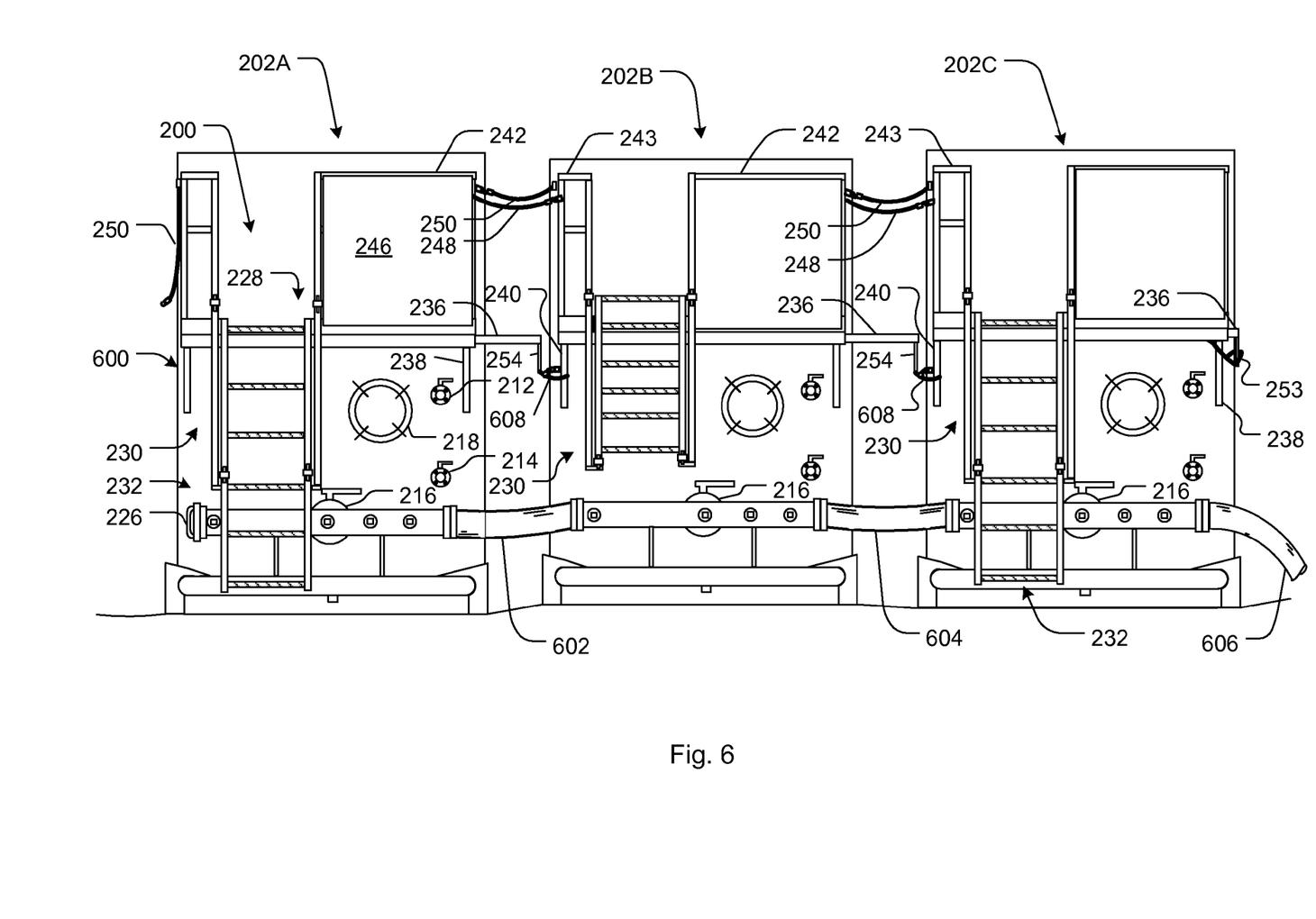
FIG. 6 are front views of multiple stair systems according to the preferred embodiment.

FIG. 2a shows oilfield tank 202 having a rear surface 203, top surface 204, a bottom surface 206, a front surface 208, and a side surface 210. In addition, oilfield tank 202 has a side surface 600, as shown in FIG. 6. In the preferred embodiment, stair system 200 rigidly attaches to front surface 208, but could be attached to a rear or side surface in alternative embodiments.

Figure 3:
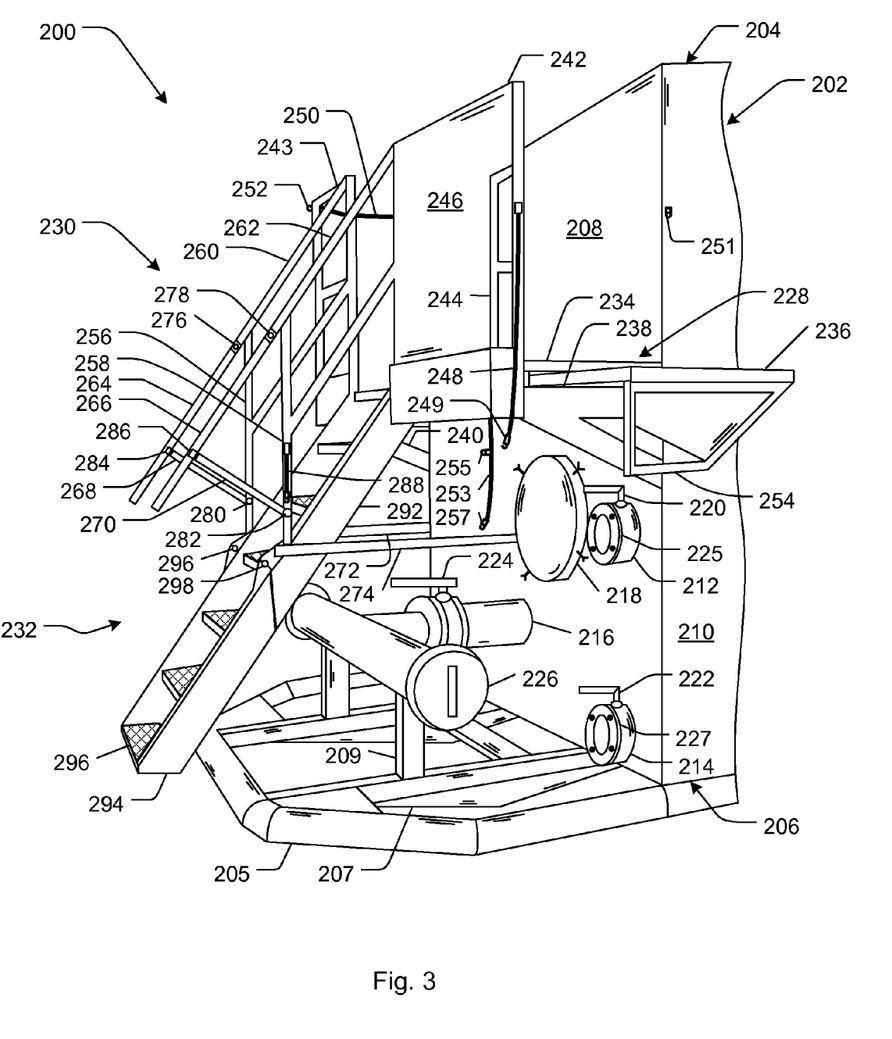
FIG. 3 is an oblique view of a stair system for a mobile storage tank according to the preferred embodiment.

Referring now to FIG. 3 in the drawings, an oblique view of stair system 200 according to the preferred embodiment is illustrated. Front surface 208 is shown carrying pipes 212, 214, 216, and 218. Pipes 212, 214, 216 and 218 extend through front surface 208 and enter into one or more chambers (not shown) carried by oilfield tank 202. The pipes provide fluid passage for fracturing fluids, drilling mud, crude oil and various other liquids or slurries. In the preferred embodiment, pipes 212, 214, 216 include manually operated valves 220, 222, and 224, respectively, for opening and closing the passage. In alternative embodiments, valves 220, 222, and 224 may include an actuator for opening and closing the passage. Tubing, as shown in FIG. 6, are coupled to pipe 216 for joining multiple oilfield tanks. In the preferred embodiment, pipe 216 is configured to direct fluid flow parallel to front surface 208. This configuration enables a worker to more easily attach tubing to adjacent oilfield tanks, however, in an alternative embodiment, pipe 216 could be designed with a configuration similar to pipes 212, 214. Pipe caps 225, 226, 227 are placed on pipe 212, 214, 216, respectively when the pipes are not being used. The pipe caps prevent unwanted materials from entering into the pipe during transit or storage. Horizontal support members 205, 207 attach to bottom surface 206. A vertical support member 209 is shown attached to horizontal support member 207. Vertical support member 209 attaches to pipe 216 for providing additional support and rigidity.

Stair system 200 comprises a unique combination of a foldable staircase and an extendable platform. In the preferred embodiment, stair system 200 includes platform subsystem 228, rail subsystem 230, and staircase subsystem 232. Platform subsystem 228 comprises a platform 234 and a retractable platform extension 236. As shown, platform 234 is attached to front surface 208 and is supported by two supporting frames 238, 240. The unique features of platform subsystem 228 are more fully discussed with reference to FIGS. 4a and 4b in the drawings. Two guard rails 242, 243 vertically attach to platform subsystem 228 for providing rigidity and security for a worker traversing platform subsystem 228. Optional stiffening support 244 attaches to guard rail 242 for additional rigidity. In the preferred embodiment, a covered surface 246 is composed of a metallic material and attaches to guard rail 242. Surface 246 provides additional rigidity and can be configured to include logos, numbers, warning signs, and other similar messages. In alternative embodiments, surface 246 may be attached to guard rail 242 by various fastening means. For example, surface 246 could be attached with magnets, flanges, tabs, connection devices, or other similar devices. In addition, surface 246 could be composed of alternative materials, such as plastic, composite, wood, or a combination thereof.

In some embodiments, the stair system 200 can include a removable barrier for at least partially blocking unprotected edges of the walkway. For example, chains 248, 250 can be used as such removable barriers. Chains 248, 250 are shown attached to guard rails 242, 243, respectively. Chain 248 includes a connection device 249 which couples to loop 251 when retractable platform extension 236 is not being used, and to a loop 252 of a similar adjacent stair system when retractable platform extension 236 is being used. Chain 250 attaches to loop 251 of a similar adjacent stair system when the retractable platform extension of that stair system is extended. The stair system 200 can also include platform securing means for securing the retractable platform extension 236 in a retracted or extended position. For example, the retractable platform extension 236 can be secured using a chain 253. Chain 253 attaches to guard rail 242 and carries a loop 255 and a connection device 257. A worker may secure retractable platform extension 236 by wrapping chain 253 around grip handle 254 and connecting connection device 257 to loop 255, as shown in FIG. 4b. In alternative embodiments, the platform securing means can include various other connection devices and loops, fastening means, such as magnets, flanges, tabs, or other connection devices.

In the preferred embodiment, stair system 200 incorporates chains 248, and 250 as removable barriers and chain 253 as a platform securing means, but it should be understood that alternative embodiments could include rope, wire, or other suitable materials in lieu of chains. In addition, alternative embodiments could replace chains 248, 250 with a rigid support member. For example, an alternative embodiment could incorporate a rigid removable or retractable barrier, such as a beam or rod that telescopes, slides, or pivots on stair system 200 or a surface of oilfield tank 202 for extending to another similar adjacent stair system. An example of a rigid retractable barrier would be a gate that pivotally attaches to the guard rail for pivotal rotation to a position substantially parallel to the front surface when the platform system is being used, and for pivotal rotation to a position substantially perpendicular to the front surface when the platform system is not being used. The rigid removable barrier provides additional support and security as a worker uses the platform subsystem.

Rail subsystem 230 includes two vertical supports 256, 258, two first hand rail members 260, 262, two second hand rail members 264, 266, and two moveable supports 268, 270. In alternative embodiments, stair system 200 can be designed without a rail subsystem or with a rail subsystem with one hand rail. In the preferred embodiment, members of the rail subsystem 230 fold when stair system 200 is in retracted mode, as shown in FIGS. 2b, 2c, 5a and 6 in the drawings. Vertical supports 256, 258 are supported by horizontal supports 272, 274 and staircase subsystem 232. First hand rail members 260, 262 rigidly attach to vertical supports 256, 258, respectively. In addition, first hand rail members 260, 262 attach to guard rail 242, 243 for additional rigidity and support. Second hand rail members 264, 266 are pivotally coupled to first hand rail members 260, 262 with pivot joints 276, 278. Pivot joints 276, 278 enable second hand rail members 264, 266 to fold to a position substantially parallel and alongside vertical support 256, 258 and enable pivotally rotation to a position substantially parallel and longitudinal to the first hand rail members 260, 262 during retracted mode.

Moveable supports 268, 270 pivotally attach to vertical supports 256, 258 with pivot joints 280, 282, respectively. Moveable supports 268, 270 provide additional support and rigidity for second hand rail members 264, 266. Pivot joints 280, 282 enable moveable supports 268, 270 to pivotally rotate to a position substantially parallel and alongside vertical support 256, 258 during retracted mode and enable pivotal rotation to a position substantially perpendicular to second hand rail members 260, 262 during extended mode. Two locking devices 284, 286 attach to distal ends of moveable supports 268, 270, respectively, for locking moveable supports 268, 270 to second hand rail members 264, 266. Securing devices 288 attaches to vertical support 258 and secures moveable supports 270 and second hand rail member 266 to a position substantially parallel to vertical supports 258. In alternative embodiments, the second hand rail members could telescope or slide within or alongside the first hand rail members. In addition, alternative embodiments could include gripping grooves or other means for providing friction, traction, and gripping operably associated with the rail members. For example, the rail members may include grip tape, a knurled surface treatment, or be embossed or engraved with various surface treatments, textures, or patterns.

In the preferred embodiment, second hand rail members 264, 266 are manually rotated; however, it should be appreciated that in alternative embodiments, rail subsystem 230 could include an actuator that rotates second hand rail members 264, 266 to a position substantially parallel to vertical supports 256, 258, respectively. For example, the actuator could be a pneumatic, hydraulic, motor, spring, or similar device that attaches to the second hand rail and an operably associated member of stair system 200 or a surface of oilfield tank 202.

Staircase subsystem 232 comprises a first staircase member 292 and a second staircase member 294, each staircase member carrying a plurality of stairs 296. In the preferred embodiment, stairs 296 are composed of grip strut for added traction as a worker climbs and descends staircase subsystem 232. It should be understood that a myriad of gratings or non-slip materials could be used in lieu of the preferred materials. For example, the grip strut could be replaced with bar grating or material that is embossed or engraved with various surface treatments, textures, or patterns.

Figure 8:
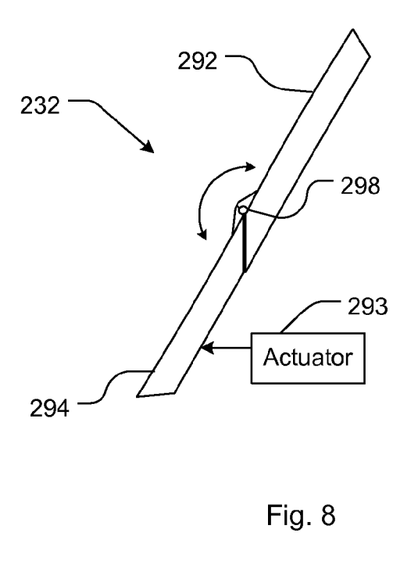
FIG. 8 is a block diagram showing an actuator for extending and retracting a staircase.

In the preferred embodiment, first staircase member 292 is rigidly attached to platform subsystem 228 and pivotally attached to second staircase member 294 with pivot joints 296, 298. Pivot joints 296, 298 enable pivotal rotation of second staircase member 294 to a position substantially parallel and above the first staircase member 292 during retracted mode and enable pivotal rotation to a position substantially parallel and longitudinal to first staircase member 292 during extended mode. As shown in FIG. 8, alternative embodiments of staircase subsystem 232 could include an actuator 293 that rotates second staircase member 294 about pivot 298. Actuator 293 could be a pneumatic, hydraulic, motor, spring, or any suitable device. In addition, alternative embodiments may include a second staircase member that telescopes or slides within or alongside the first staircase member.

Figure 4A:
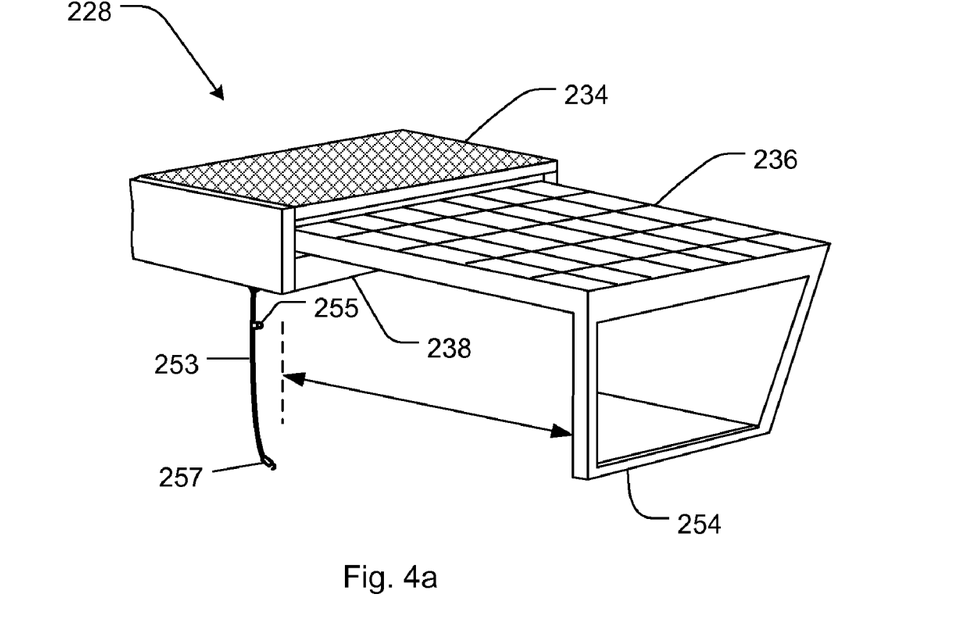
FIGS. 4a and 4b are oblique views of a platform subsystem shown in FIG. 2.
Figure 4B:
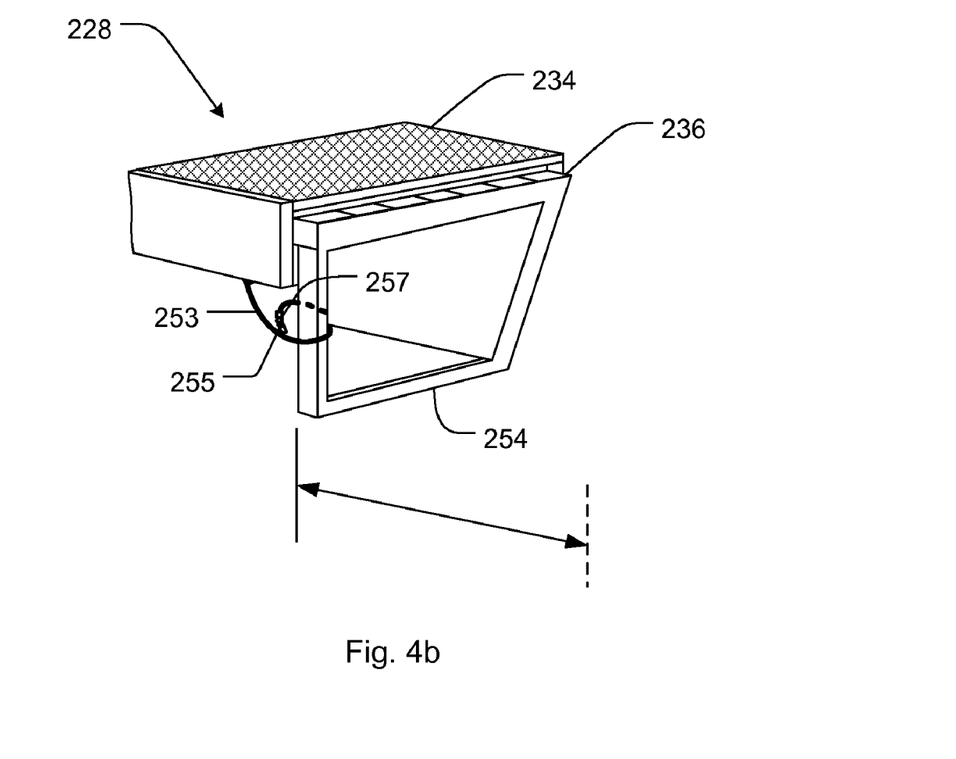

Referring now to FIGS. 4a and 4b in the drawings, oblique views of platform subsystem 228 of FIG. 3 are illustrated. Platform subsystem 228 comprises platform 234 and retractable platform extension 236. A grip handle 254 attaches to retractable platform extension 236. FIG. 4a depicts retractable platform extension 236 in an extended position, while FIG. 4b depicts retractable platform extension 236 in a retracted position. As shown in FIG. 6, an extended position is desired when creating a walkway between multiple adjacent oilfield tanks. In the preferred embodiment, platform 234 is composed of grip strut, while retractable platform extension 236 is composed of bar grating. It should be understood that platform 234 and retractable platform extension 236 could be composed of various material for increasing traction and for enabling materials, i.e., mud and water, to pass through the surface. In addition, grip strut and bar grating could be replaced with material that is embossed or engraved with various surface treatments, textures, or patterns. In the preferred embodiment, bar grating is particularly desired for the retractable platform extension because the grating does not have the grip strut's saw-toothed edges, which could cause problems when extending and retracting the retractable platform extension. It should also be understood that a removable platform extension could be used with or in lieu of platform extension 236. For example, the removable platform could be a wooden beam or any suitable device that extends from one platform system towards another.

In the preferred embodiment, platform 234 is positioned above retractable platform extension 236, and platform extension 236 slides on support 238 and other supports (not shown) located below platform 234. A stopper (not shown) is attached to the bottom of platform 234 to restrict the distance that retractable platform extension 236 may be extended. In alternative embodiments, retractable platform extension 236 could be positioned above platform 234. In addition, alternative embodiments could pivot retractable platform extension 236 about a device that attaches to platform subsystem 228 or a surface of oilfield tank 202. It should be appreciated that alternative embodiments could include a retractable platform extension that retracts and extends on both sides to the platform subsystem. In addition, alternative embodiments could include a retractable platform extension that extends the entire length of the platform.

Figure 7:
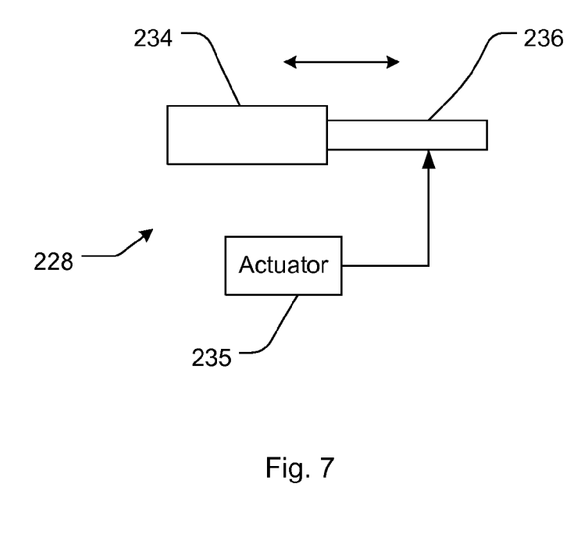
FIG. 7 is a block diagram showing an actuator for extending and retracting a retractable platform extension.

In the preferred embodiment, retractable platform extension 236 is manually extended and retracted; however, it should be appreciated that in alternative embodiments, platform subsystem 228 could include an actuator 235 that extends and retracts retractable platform extension 236. As shown in FIG. 7 in the drawings, a block diagram shows that actuator 235 operably associates with platform subsystem 228. Actuator 235 could be a pneumatic, hydraulic, motor, spring, or a similar device that is coupled to the retractable platform extension and an operably associated member of stair system 200 or a surface of oilfield tank 202. To manually extend retractable platform extension 236, a worker can pull grip handle 254 in a direction parallel and away from platform 234. Grip handle 254 is designed to protect the worker's hands from coming in contact with support 238 or any other member of stair system 200 or a surface of oilfield tank 202.

Figure 9:
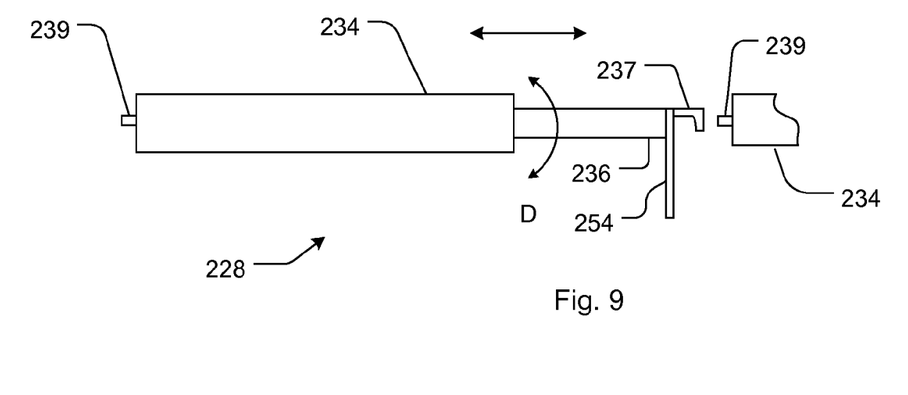
FIG. 9 is a side view of an embodiment of the platform subsystem configured for rigidly attaching to a neighboring platform subsystem.

As shown, platform subsystem 228 includes a chain 253 for securing retractable platform extension 236 in the retracted position. Chain 253 has a connection device 257 and a loop 255. FIG. 4b shows chain 253 wrapped around grip handle 254 and connection device 257 attached to loop 255. In alternative embodiments, a quick-connect type of attachment, such as a twist lock fastener or a snap fit fastener could be used in lieu of connection device 257 and 255. For example, FIG. 9 shows an alternative embodiment. In FIG. 9, bracket 237 rigidly attaches to platform extension 236 and couples with a connection device 239. It should be understood that bracket 237 and connection device 239 are not always aligned. Platform extension 236 is capable of pivoting on a pivoting device (not shown) to align bracket 237 with connection device 239. In addition, platform extension 236 may pivot due to low tolerances between the interface of platform 234 and platform extension 236. As depicted, pivotal rotation is shown with arrow D. In the preferred embodiment, chain 253 is a chain, but it should be understood that alternative embodiments could include rope, wire, or other suitable materials in lieu of a chain.

Figure 5A:
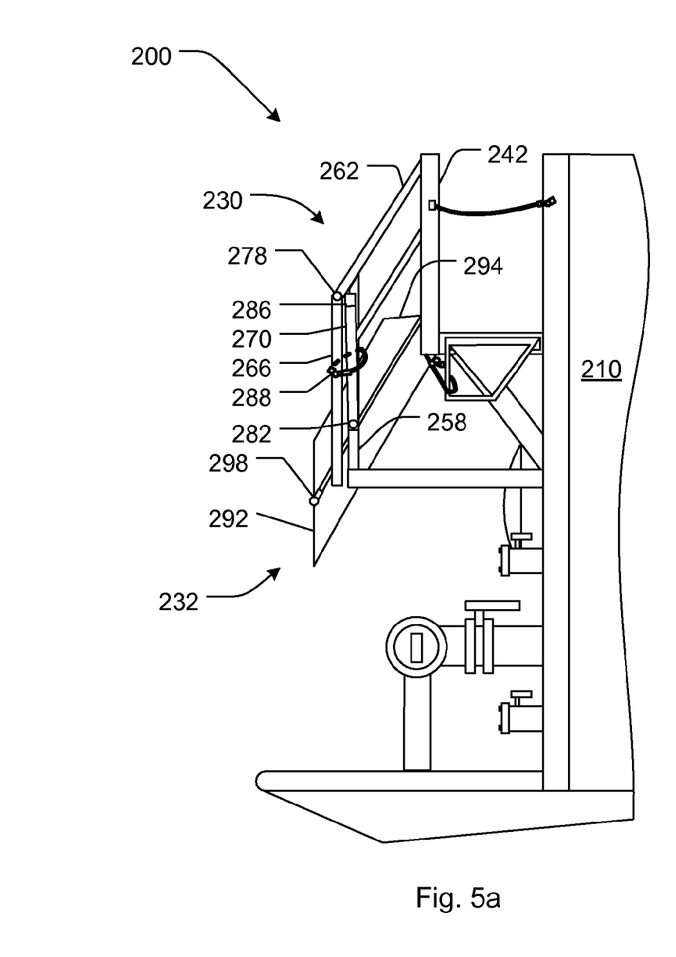
FIGS. 5a and 5b are side views of the stair system shown in FIG. 2.
Figure 5B:
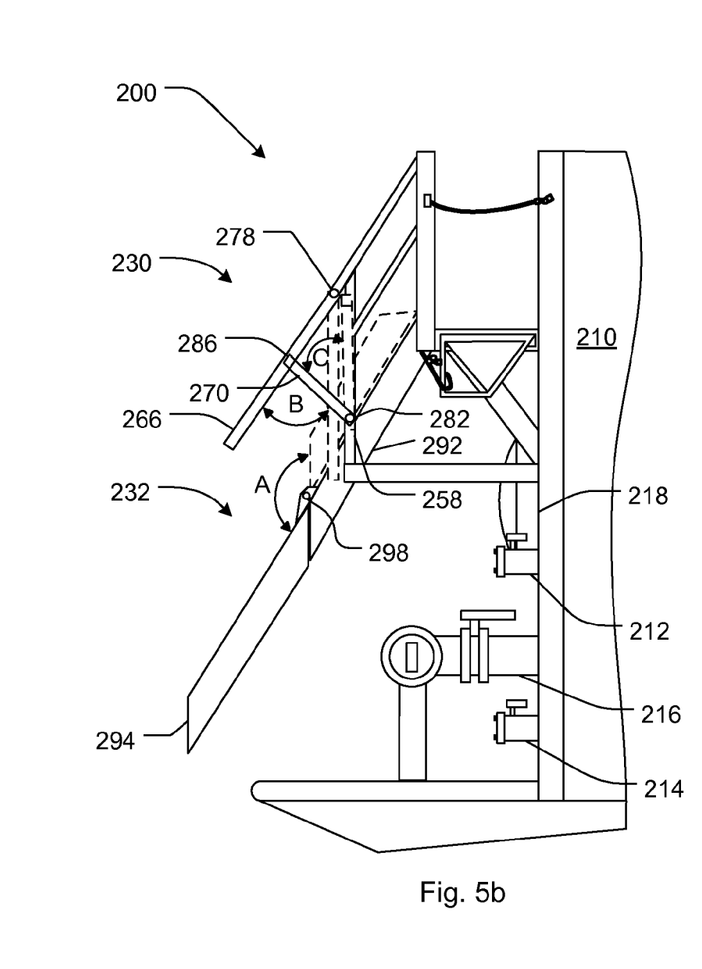

Referring now to FIGS. 5a and 5b in the drawings, side views of stair system 200 are illustrated. FIG. 5a depicts the preferred embodiment of staircase subsystem 232 and rail subsystem 230 in a folded position. In this position, second staircase member 294 is positioned substantially parallel and above first staircase member 292. A locking device (not shown) could be used to secure second staircase member 294 in this position. In the preferred embodiment, second hand rail member 266 and moveable support 270 are positioned substantially vertical and alongside vertical support 258 and secured in this position with chain 288. FIG. 5b depicts the preferred embodiment of staircase subsystem 232 and rail subsystem 230 in the folded position with dashed lines and in the extended position with solid lines. To achieve the extended position, second staircase member 294 is pivotally rotated on pivot 298 as shown with arrow A; second hand rail member 266 is pivotally rotated on pivot 278 as shown with arrow B; and, moveable support 270 is pivotally rotated on pivot 282 as shown with arrow C. In this position, moveable support 270 couples with second hand rail member 266 with locking device 286. In the preferred embodiment locking device 286 is a metal channel, but it should be appreciated that locking device 286 may be any suitable device for securing second rail handle in an extended position.

Referring now to FIG. 6 in the drawings, front views of multiple oilfield tanks 202 with stair systems 200 according to the preferred embodiment are illustrated. As shown, an oilfield tank 202A is positioned adjacent to an oilfield tank 202B and oilfield tank 202B is positioned adjacent to an oilfield tank 202C. It should be understood that FIG. 6 is a simple depiction of three oilfield tanks; whereas, the number of oilfield tanks used in a single operation could increase up to a hundred or more. As explained, the oilfield tanks are positioned side-by-side and joined together with tubing to create a large reservoir for storing and dispensing liquid. As shown, tubing 602, 604 are coupled to one end of pipes 216 of oilfield tanks 202A and 202B, 202B and 202C, respectively. Tubing 606 is coupled to one end of pipe 216 of oilfield tank 202C and could be attached to other pipes or devices (not shown) operably associated with the oilfield operation. As shown, one end of pipe 216 of oilfield tank 202A is capped with pipe cap 226. Additional tubing could be used to interlink pipes 212, 214 between the oilfield tanks (not shown).

Staircase subsystem 232 and rail subsystem 230 are shown in the extended position on oilfield tank 202A and oilfield tank 202C and in the folded position on oilfield tank 202B. Oilfield tanks 202A and 202C show staircase subsystem 232 and rail subsystem 230 in extended mode, while oilfield tank 202B shows the subsystems in retracted mode. It should be understood that the stair system on oilfield tank 202B could be configured in extended mode. For example, as the number of oilfield tanks increase, more stair systems will be configured in extended mode so a worker is not required to walk the entire length of the walkway before descending. Retractable platform extension 236 is shown in the extended position on oilfield tank 202A and oilfield tank 202B and in the retracted position on oilfield tank 202C. As shown on oilfield tank 202C, chain 253 secures retractable platform extension 236 to support member 238. When extended, retractable platform extension 236 is secured with chain 608 by looping around grip handle 254 and support member 240. In this configuration, a walkway is formed between oilfield tanks 202A, 202B, and 202C. Chains 248, 250 are shown connected to guard rails 242, 243, respectively for added security as a worker traverses the walkway. This configuration enables a worker to climb the staircase subsystem 232 of oilfield tank 202A, traverse the walkway and descend staircase subsystem 232 of oilfield tank 202C. Hence, the danger of tripping on tubing, manifolds and other devices between oilfield tanks is mitigated. In addition, a worker no longer is required to climb and descend each stair system to access the top surface of each oilfield tank. Therefore, this configuration overcomes the problems associated with a conventional stair system for a mobile storage tank.

The concepts of the present application are unique in that the present application introduces a unique combination of a foldable staircase and an extendable platform for a stair system. It is evident by the foregoing description that the subject application has significant benefits and advantages, in particular, the stair system incorporates: (1) a staircase and a railing subsystem that are capable of folding during retracted modes; (2) a staircase and a railing subsystem that are capable of extending during extended mode; and (3) a platform subsystem that creates a walkway along adjacent mobile storage tanks. The walkway overcomes the problems associated with a conventional stair system: wasting time climbing and descending stair systems of adjacent mobile storage tanks, and mitigates the potential dangers associated with stepping over tubing, manifolds, and other similar devices operably associated with oilfield operations.

It is apparent that an invention with significant advantages has been described and illustrated. The particular embodiments disclosed above are illustrative only, as the invention may be modified and practiced in different but equivalent manners apparent to those skilled in the art having the benefit of the teachings herein. It is therefore evident that the particular embodiments disclosed above may be altered or modified, and all such variations are considered within the scope and spirit of the invention. Accordingly, the protection sought herein is as set forth in the description. Although the present invention is shown in a limited number of forms, it is not limited to just these forms, but is amenable to various changes and modifications without departing from the spirit thereof.

What is claimed is:

1. A stair system for a mobile oilfield storage tank, the stair system comprising:
    a platform subsystem attached to a front wall of the mobile oilfield storage tank, the platform subsystem comprising:
        a continuous platform suitable for use as a walkway;
        a support extending from and rigidly attached to the front wall, the support being configure to support the continuous platform, the support forming a gap under the continuous platform; and
        a retractable platform extension slidingly engaged to the platform subsystem, the platform extension being positioned below the continuous platform while in a retracted position, the retractable platform being configured to slide within the gap formed by the support, the retractable platform being configured for selectively extending the walkway in a direction transverse to the front wall such that the retractable platform provides walking access to a platform subsystem of an adjacent second mobile storage tank;
    a staircase subsystem comprising:
        a first staircase member having a first end and a second end, the first end being attached to the platform subsystem, the first staircase member extending in a direction from the front wall of the oilfield mobile storage tank such that the second end of the first staircase member is further from the front wall of the oilfield mobile storage tank than the first end of the first staircase member; and
        a second staircase member pivotally connected to the second end of the first staircase member;
    wherein the second staircase member is pivotally rotatable between a retracted mode and an extended mode,
    wherein, when the second staircase member is in the retracted mode, at least a portion of the second staircase member is positioned above at least a portion of the first staircase member, and
    wherein, when the second staircase member is in the extended mode, the staircase subsystem is suitable for use as a stairway to the platform; and
    a hand rail subsystem comprising:
        a vertical support attached to the first staircase member; and
        a hand rail comprising:
            a first hand rail member attached to the vertical support;
            a second hand rail member pivotally attached to the first hand rail member; and
            a moveable support pivotally attached to the vertical support;
    wherein the second hand rail member is pivotally rotatable relative to the first hand rail member, and
    wherein the moveable support is pivotally rotatable relative to the vertical support.

2. The stair system according to claim 1, further comprising an actuator for extending and retracting the retractable platform extension.

3. The stair system according to claim 1, further comprising an actuator for pivotally rotating the second staircase member between the retracted mode and the extended mode.

4. The stair system according to claim 1, further comprising a removable barrier selectively positionable for blocking at least a portion of an edge of the platform.

5. The stair system according to claim 1, further comprising:
- an actuator for pivoting the second staircase between the retracted mode and the extended mode.

6. A stair system for a mobile oilfield storage tank having front surface and a top surface, the stair system comprising:
- a continuous platform attached to the front surface, the platform being suitable for use as a walkway, the walkway providing viewing access to the top surface;
- a support extending from and rigidly attached to the front surface, the support being configure to support the continuous platform, the support forming a gap under the continuous platform; and
- a platform extension slidingly engaged to the platform subsystem, the platform extension being positioned below the continuous platform while in a retracted position, the retractable platform being configured to slide within the gap formed by the support during transition between an extended position and the retracted position, the retractable platform being configured for selectively extending the walkway in a direction transverse to the front wall such that the retractable platform provides walking access to a platform subsystem of an adjacent second mobile storage tank; and
- a first staircase having:
  - a first end and a second end, the first end being attached to the platform and adapted to extend downwardly from the platform and in a direction relatively normal to the front surface of the storage tank such that the second end of the first staircase is spaced further from the front surface than the first end.

7. The stair system of claim 6, further comprising:
a hand rail subsystem having:
- a vertical support attached to the first staircase; and
- a hand rail having:
  - a first hand rail member attached to the vertical support;
  - a second hand rail member pivotally attached to the first hand rail member; and
  - a moveable support pivotally attached to the vertical support;
- wherein the second hand rail member is pivotally rotatable relative to the first hand rail member, and
- wherein the moveable support is pivotally rotatable relative to the vertical support.

8. The stair system according to claim 6, wherein the platform extension is pivotally attached to the platform.

9. The stair system according to claim 6, further comprising:
- a barrier selectively positionable for blocking at least a portion of an edge of the platform.

10. The stair system of claim 6, further comprising:
- a second staircase pivotally connected to the second end of the first staircase;
- wherein the second staircase pivots between a retracted mode and an extended mode.

11. The stair system of claim 10, wherein, when the second staircase is in the retracted mode, at least a portion of the second staircase is positioned above at least a portion of the first staircase, and
- wherein, when the second staircase is in the extended mode, the first staircase and the second staircase form a stairway for access to the platform.

12. The stair system according to claim 6, wherein the platform extension is retractably attached to the platform.

13. The stair system according to claim 12, further comprising:
- an actuator for extending and retracting the platform extension.

14. The stair system according to claim 6, further comprising:
- a guard rail attached to the platform.

15. The stair system according to claim 14, further comprising:
- a gate pivotally attached to the guard rail.

* * * * *